United States Patent
Andar et al.

(10) Patent No.: US 10,999,434 B1
(45) Date of Patent: May 4, 2021

(54) ARTIFICIAL INTELLIGENCE ("AI") INTEGRATION WITH LIVE CHAT

(71) Applicant: Bank of America Corporation, Charlotte, NC (US)

(72) Inventors: Ravisha Andar, Plano, TX (US); Sushil Golani, Charlotte, NC (US); Ashwini Patil, Richardson, TX (US); Ramakrishna R. Yannam, The Colony, TX (US); Priyank R. Shah, Plano, TX (US); Pavan Chayanam, Alamo, CA (US); Yogesh Raghuvanshi, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/889,953

(22) Filed: Jun. 2, 2020

(51) Int. Cl.
| | |
|---|---|
| H04M 3/51 | (2006.01) |
| H04M 7/00 | (2006.01) |
| G10L 15/26 | (2006.01) |
| G10L 15/22 | (2006.01) |
| G06N 20/00 | (2019.01) |
| G06N 5/04 | (2006.01) |

(52) U.S. Cl.
CPC .......... *H04M 3/5166* (2013.01); *G06N 5/04* (2013.01); *G06N 20/00* (2019.01); *G10L 15/22* (2013.01); *G10L 15/26* (2013.01); *H04M 3/5183* (2013.01); *H04M 7/0021* (2013.01); *H04M 2201/40* (2013.01); *H04M 2203/558* (2013.01)

(58) Field of Classification Search
CPC ........... H04M 3/5166; H04M 3/5183; H04M 7/0021; H04M 2201/40; H04M 2203/558; G06N 20/00; G06N 5/04; G10L 15/1815; G10L 15/22; G10L 15/26; G06F 3/04817; G06F 40/279; G06F 40/30
USPC ......... 379/88.13, 88.16, 88.17, 88.18, 88.22, 379/88.23, 88.26
See application file for complete search history.

(56) References Cited

U.S. PATENT DOCUMENTS

| | | | |
|---|---|---|---|
| 6,628,763 B1 * | 9/2003 | Mani | H04Q 3/0016 379/142.08 |
| 9,549,068 B2 * | 1/2017 | Krishnan | H04M 3/5232 |
| 10,171,662 B1 * | 1/2019 | Zhou | H04L 51/02 |
| 10,601,995 B2 * | 3/2020 | Feast | G06Q 10/10 |

(Continued)

OTHER PUBLICATIONS

Lerato et al., "Open Source VoiceXML Interpreter over Asterisk for Use in IVR Applications," https://www.researchgate.net/publication/228873959_Open_Source_VoiceXML_Interpreter_over_Asterisk_for_Use_in_IVR_Applications, Aug. 2009.

(Continued)

*Primary Examiner* — Binh Kien Tieu
(74) *Attorney, Agent, or Firm* — Weiss & Arons LLP; Michael A. Springs, Esq.

(57) ABSTRACT

When a caller initiates an interaction with an interactive voice response ("IVR") system, the caller may be transferred to a live agent. Apparatus and methods are provided for integrating automated tools into the interaction after the caller been transferred to the agent. The agent may determine which AI responses are appropriate for the caller. AI may be leveraged to suggest responses for both caller and agent while they are interacting with each other. Such human-computer interaction may shorten response time of human agents and improve efficiency of IVR systems.

16 Claims, 8 Drawing Sheets

(56) References Cited

U.S. PATENT DOCUMENTS

| | | | | |
|---|---|---|---|---|
| 10,750,019 | B1* | 8/2020 | Petrovykh | G06F 40/279 |
| 2013/0317993 | A1* | 11/2013 | Wasserman | G06Q 30/016 |
| | | | | 705/304 |
| 2018/0367480 | A1* | 12/2018 | Housman | G06F 40/216 |
| 2019/0028587 | A1* | 1/2019 | Unitt | G06F 9/453 |
| 2019/0267000 | A1* | 8/2019 | Liashenko | G10L 13/00 |
| 2019/0273754 | A1* | 9/2019 | Ting | H04L 63/1425 |
| 2020/0160356 | A1* | 5/2020 | McCord | G10L 15/1815 |
| 2020/0387832 | A1* | 12/2020 | Jordan | G06N 5/003 |

OTHER PUBLICATIONS

"Machine Learning," https://en.wikipedia.org/wiki/Machine_learning, Wikimedia Foundation, Inc., Dec. 31, 2020.

\* cited by examiner

ARTIFICIAL INTELLIGENCE ("AI") INTEGRATION WITH LIVE CHAT

FIELD OF TECHNOLOGY

Aspects of the disclosure relate to technology for improving computer-human interactions.

BACKGROUND

Interactive voice response ("IVR") systems receive inputs from callers. The inputs may be voice, text or selections. These inputs typically correspond to the caller attempting to express a purpose or goal of the caller. IVR systems use a variety of techniques to correctly discern the meaning of the caller inputs and allow the caller to efficiently achieve their purpose or goal.

However, the IVR system may not be able to accurately discern the purpose or goal of the caller. In such instances, the IVR system may be configured to transfer the caller to a human agent. Typically, after the caller is transferred to the human agent, the human agent exclusively attends to the caller without further automated assistance from the IVR system.

It is technically challenging to integrate responses from an automated system into responses formulated by a human agent such that involvement by both the human agent and automated system improves efficiency of the IVR system and increases caller satisfaction. However, as described herein, ARTIFICIAL INTELLIGENCE ("AI") INTEGRATION WITH LIVE CHAT provides apparatus and methods for efficiently leveraging an IVR system even after a caller is transferred to a human agent.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
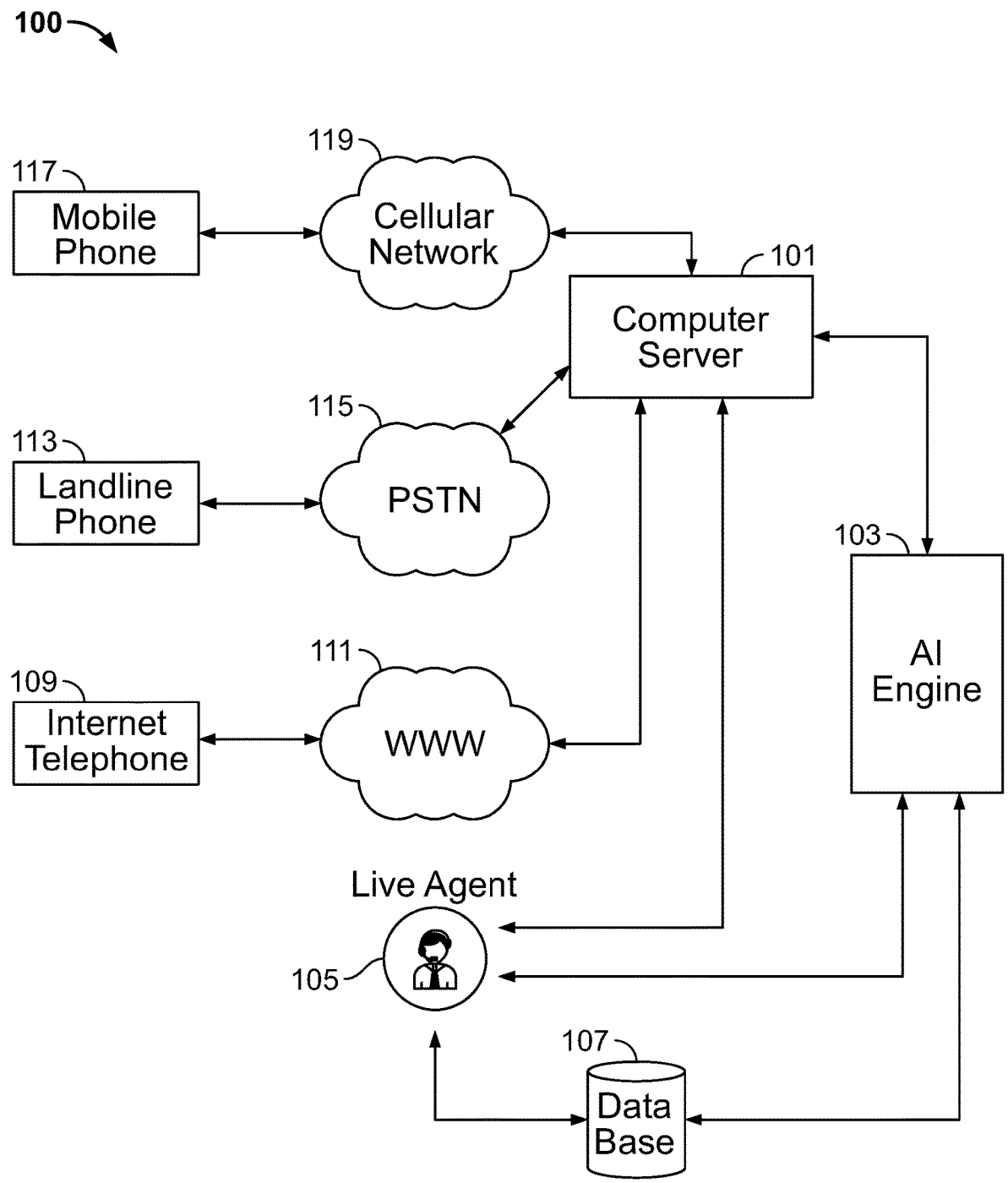
FIG. 1 shows an illustrative system in accordance with principles of the disclosure.

Methods are provided for leveraging artificial intelligence to integrate human and machine responses within an interactive voice response ("IVR") system. Methods may include initiating a conversation with a human caller and an artificial intelligence ("AI") engine. Methods may include capturing voice inputs generated by the human caller. Methods may include providing the voice inputs to the AI engine.

The AI engine may attempt to decipher a question or concern of the human caller. The AI engine may analyze the caller's voice inputs to decipher the question or concern. Methods may include receiving, from the AI engine, a predictive recommendation. The predictive recommendation may include a machine generated determination that the human caller would best be serviced by transferring the caller to a human agent.

The AI engine may initiate a hand-off procedure to the human agent. Methods may include transferring the human caller to the human agent. Methods may include, after transferring the human caller to the human agent, continuing to provide voice inputs generated by the human caller to the AI engine. Even after transferring the caller to the human agent, the AI engine may continue to "listen" to voice inputs generated by the caller. The AI engine may continue to generate predictive recommendations based on analysis of the voice inputs.

Methods may include providing, to the human agent, predictive responses to the caller's voice inputs generated by the AI engine. The predictive responses may include responses to the voice inputs that the human agent may provide to the caller. The predicative responses may include fully formulated responses. Fully formulated responses include machine generated responses that may be forwarded to the human caller by the human agent. Fully formulated responses may be forwarded to the human caller without the human agent making any changes or edits to the machine generate response.

In some embodiments, the human agent may edit a predictive response generated by the AI engine. The human agent may edit the machine generated response so that it addresses a specific question or concern raised by the caller. However, even when after any editing, the machine generated predictive response may reduce a response-time latency of the human agent. For example, providing the predictive response may increase a number of callers that may be concurrently managed by a single human agent.

The AI engine may provide predictive responses to conversations managed by the human agent. The human agent may select a machine generated response and forward it to the caller. By providing the machine generated responses, the AI engine may allow the human agent to manage multiple concurrent conversations. Even though the human agent may edit a predictive response, using the machine generated responses may reduce the amount of time the human agent would have had to spend formulating an original response to the caller.

While monitoring inputs of the caller concurrently with the human agent, the AI engine may generate a plurality of predictive responses. The human agent may determine which AI generated responses are appropriate for the caller. The human agent may accept or reject machine responses generated by the AI engine. The AI engine may be configured to recursively train itself based on whether the human agent accepts or rejects one or more of the machine generated responses.

Methods may include providing, to the AI engine, responses of the human agent to voice inputs of the caller. The responses of the human agent may include voice, text or any suitable response. The AI engine may also be provided with predictive machine generated responses that were rejected by the human agent. The AI engine may also be provided with predictive machine generated responses that were edited by the human agent before being transmitted to a caller. The AI engine may be recursively trained by observing how its machine generated responses are utilized by the human agent.

The recursive training of the AI engine may reduce a frequency of how often the AI engine generates a predictive recommendation to transfer a caller to the human agent. For example, the AI engine may learn from acceptance, rejection or editing of its machine generated responses. The AI engine may learn from the recursive training and attempt to understand why some of its machine generated responses were accepted by the human agent and others were rejected by the human agent. The AI engine may learn from the recursive training and attempt to understand why some machine generated responses were edited by the human agent before transmission to the caller.

Based on the recursive training, the AI engine may improve utilization of its machine generated responses. Improving utilization of machine generated responses may include generating responses that are accepted by the human agent or caller. Such effective human-computer interaction may shorten response times of human agents and improve efficiency of human agents. Other efficiency considerations may include allowing human agents manage multiple conversations concurrently or supervise multiple automated channels concurrently. The ability of the human agent to forward useful machine to a caller may allow the human agent to effectively manage multiple interactions with multiple callers.

The AI engine may be leveraged to provide machine responses in parallel to both the caller and the human agent. For example, even after transferring a caller to the human agent, the AI engine may continue to monitor voice inputs of the caller in parallel with the human agent. The AI engine may independently provide machine generated responses to both the caller and the human agent. The AI engine may generate machine responses that are provided directly to the caller based on a prior response of the human agent to the caller. The AI engine may generate machine responses that are provided directly to the caller while the caller is in communication with the human agent.

The AI engine may learn from responses provided by the human agent to the caller. Based on observing the human agent's responses, the AI engine may anticipate a forthcoming request from the caller. In response to an anticipated request, the AI engine may generate a machine response that provides information to the caller before the caller has even formulated a request. In some embodiments, the AI engine may provide the response to an anticipated request to the human agent.

The AI agent may formulate responses to anticipated requests based on analysis of historical conversations conducted with a caller. Based on learning from the historical conversations, the AI engine may generate machine responses that are specific to linguistic, dialect or semantic style of a caller. A caller or human agent may be more likely to utilize a machine generated response when the response is formulated in way that is familiar or comfortable for the caller or human agent.

The AI engine may also learn from requests submitted by a caller to a human agent. Based on learning from the caller requests, the AI engine may anticipate forthcoming request from the caller. Based on learning from the caller requests, the AI engine may anticipate a forthcoming response from the human agent. The AI agent may formulate such responses based on analysis of historical responses prepared by the human agent. Based on learning from the historical responses, the AI engine may generate machine responses that are specific to the linguistic, semantic style of the human agent. Such custom-tailored responses may be more likely to be utilized by the human agent.

The AI engine may generate a machine response that provides information to a caller before the caller formulates a request for the information. For example, the AI engine may predict what the caller will need based on prior requests of the caller. The AI engine may predict what the caller will need based on a prior response provided to the caller by the human agent.

In some embodiments, the AI engine may provide, to the human agent, a machine generated response to an expected caller request. In some embodiments, the AI engine may provide a machine generated responses to both the caller and the human agent. By providing machine generated responses to both the caller and the human agent during an interaction between the caller and human agent, the AI engine may shorten a duration of the conversation.

Providing machine generated responses to both the caller and the human agent in parallel may facilitate a resolution of the caller's concern faster by focusing the number of possible topics on a limited number of topics. Providing machine generated responses to both the caller and the human agent in parallel may facilitate a resolution of the caller's concern faster by reducing machine presented responses that are rejected by the caller or the human agent.

Even when providing machine generated responses in parallel, the AI engine may provide different machine generated responses to the caller and the human agent. For example, the AI engine may provide a variety of predictive responses to the human agent than to the human caller. The human agent may desire a variety choices so that the human agent can select a desired response and possibly edit the selected response to meet a specific caller need. The AI engine may provide a fewer number of choices to the caller.

By continuing to provide machine generated responses to the human agent even after the caller has been transferred to the human agent, the AI engine may increase a number of concurrent conversations managed by the human agent. The machine responses may allow the human agent to select presented responses and transmit them to callers without having to formulate an original response. Even if a machine generated response requires editing by the human agent to meet a caller need, editing presented responses may be faster than formulating an original response.

Machine generated responses of the AI engine may be improved by recursively training the AI engine. Recursive training may include the AI engine ingesting predictive responses generated by the AI engine and accepted by the human agent. Recursive training may include the AI engine ingesting predictive responses generated by the AI engine and rejected by the human agent. Based on observing which machine generated responses are accepted or rejected by the human agent, the AI engine may better understand how to formulate responses that are more likely to be used and accepted by the human agent.

Based on acceptance or rejections, the AI engine may learn which classes of predictive responses are helpful to the human agent. For example, the AI engine may learn that guiding the human agent to file locations is more helpful that attempting to formulate a complete response. It may be time consuming for the human agent to locate information relevant to a caller's concern. However, the human agent may be able to quickly customize a response to the caller after the AI engine guides the human agent to the relevant information.

The AI engine may capture keyboard inputs generated by the human agent. The keyboard inputs may include words or letters typed by the human agent in response to the caller. The AI engine may generate a machine interpretation of the keyboard inputs. For example, the AI engine may determine a semantic meaning of the keyboard inputs. Based on the interpretation, the AI engine may determine a machine generated response that will help the human agent address a concern of the caller.

A machine generated response may include providing to the human agent predictive text, generated by the AI engine, that completes a message of the human agent embodied in the keyboard inputs. For example, the AI engine may detect the following keyboard inputs: "To check your . . . ."

Based on the keyboard inputs, the AI engine may determine that a caller has asked how to check an account balance. The AI engine may then display to the human agent tutorial videos explaining how the caller may check their account balance. The human agent may select a desired video and forward to the caller. In some embodiments, based on the keyword inputs of the human agent, the AI engine may display directly to the caller tutorial videos explaining how a caller may check their account balance.

The AI engine may generate videos customized for the caller. For example, the AI engine may generate a video that are curated using the customer's own account as examples. The AI engine may generate videos that are narrated or curated using linguistic, semantic style of the caller. Such details may be culled from historical conversations conducted with a caller or a detected location of the caller. For example, the AI engine may generate tutorial videos using a currency used in a caller's geographic location.

In some embodiments, the AI engine may attempt to complete keyboard inputs of the human agent. For example, in the above example, the AI engine may present the following choices to the human agent: "To check your [checking] [savings] [investment] balance follow the steps in this [checking tutorial] [savings tutorial] [investment tutorial] video." The text shown in brackets represents choices presented by the AI engine that may be selected by the human agent. The human agent may select the desired options and transmit a customized response to the caller.

In some embodiments, the AI engine may access a database and determine the caller's current balance. The AI engine may display the balance to the human agent. The human agent may then verbally relay the balance to the caller or transmit a message to the caller that includes the current balance. Such human-computer interaction may shorten response time of human agents and improve efficiency of human agents.

In some embodiments, the human agent may hand-off control of a conversation to the AI engine. For example, if the AI engine has accurately determined an intent of the human agent associated with keyboard inputs, the human agent may signal to the AI engine to autonomously interact with the caller. In the example, above, the AI engine may have correctly determined that the human agent was about to explain to the caller how to check their account balances. The AI engine may take over the conversation from the human agent and guide the caller on how to check their account balance. Such human-computer interaction may shorten response time of human agents and improve efficiency of human agents.

The human agent may provide more directed instructions to the AI engine when handing-off control of the conversation to the AI engine. For example, the human agent may signal to the AI engine to interact directly with the caller and determine which account the caller is interested in checking. The AI engine may assume control of the conversation and determine the desired account and explain to the caller how to check the balance of the desired account. Thus, the human agent and the AI engine may work together. The AI engine may be more efficient at some tasks and the human agent more efficient at others. Configuring the AI engine to operate in parallel with the human agent may efficiently provide a caller with satisfactory responses to an inquiry or concern.

Transferring the caller to the human agent may include the AI engine providing the human agent with historical conversations conducted with the human caller. The historical conversations may include those conducted between the caller and the AI engine. The historical conversations may include those conducted between the caller and the human agent. The historical conversations may include those conducted between the caller and the AI engine and human agent operating in parallel.

The historical conversation may provide the human agent insight on a typical concern of the caller or an outstanding caller concern that has not yet been resolved. The insight may allow the human to identify a concern of a caller faster than had the human agent had to interact with the caller to identify the concern. Such human-computer interaction may shorten response time of human agents and improve efficiency of human agents.

The AI engine may generate a predicative indicator for a target historical conversation most relevant to the current conversation. For example, based on inputs provided by the caller, the AI engine may determine a context of a current conversation. The AI engine may review historical conversations and determine whether the caller's current concern is an issue the caller has raised in the historical conversations. The AI engine may locate and display to the human agent target historical conversations associated with the caller's current concern.

The AI engine may highlight to the human agent how the caller's concern raised in the target historical conversations had been resolved. The human agent may utilize solutions highlighted by the AI engine during the current conversation. Such human-computer interaction may shorten response time of human agents and improve efficiency of human agents.

The AI engine may load target conversations into a computer system used by the human agent. The AI engine may load a transaction history associated with the target conversation into a computer system used by the human agent. For example, the AI engine may determine that the caller is now concerned about credit card charges. The AI engine may determine that the caller has previously conducted target historical conversations regarding credit card charges.

The AI engine may locate relevant target historical conversations that include the caller raising concerns regarding credit card charges. The AI engine may locate relevant transactional information that triggered the charges the caller had previously been concerned about. The AI engine may locate recent charges associated with the caller's card account that, based on the historical conversations and transactions, may have triggered the caller's current concern.

The AI engine may display the target historical conversations and associated transactions to the human agent. The display of the target historical conversations and associated transactions may allow the human agent to efficiently understand a context of the caller's current concern, without directly querying the caller. Using the AI engine to provide the human agent with a contextual understanding may allow the human agent to provide detailed and more efficient customer service. Using the AI engine to provide the contextual understanding may allow the human agent to service more callers per unit of time.

The AI engine may apply a first machine learning model. The first machine learning model may be utilized by the AI engine when the AI engine interacts exclusively with the human caller. The AI engine apply a second machine learning model. The second machine learning model may be utilized by the AI engine when the AI engine interacts with the human caller in parallel with a human agent.

For example, the first machine learning model may be configured to allow for the caller to take a lead role in guiding the AI engine to desired information. Using the first machine learning model, the AI engine may provide a single option to the user and will not suggest two or more alternatives. The first machine learning model may be specifically configured to provide the caller easy to understand, clear and straightforward options.

Training of the AI engine may include providing, to the first machine learning model, the predictive responses generated by the AI engine and accepted or rejected by the human agent when the AI engine interacts with the human caller in parallel with the human agent. Although the first machine learning model may not be deployed when the AI engine interacts with the human caller in parallel with the human agent, the first machine learning model may learn from predictive responses generated by the AI engine when operating in-parallel. Responses generated by the AI engine when operating in-parallel may be generated by the second machine learning model.

On the other hand, the second machine learning algorithm, which may be utilized by the AI engine when the AI engine interacts with the human caller in parallel with a human agent, may be more proactive when generating machine responses. For example, the second machine learning model may provide two or more alternatives options to the human agent. The human agent may welcome alternative options. The human agent may be comfortable rejecting generated AI responses. The human agent may be adept at editing generated AI responses.

Training of the AI engine may include providing, to the second machine learning model, predictive responses generated by the AI engine and accepted or rejected by the human caller. The predictive responses generated by the AI engine may be accepted or rejected during exclusive interaction (e.g., no human agent participation) between the AI engine and the human caller. Although the second machine learning model may not be deployed when the AI engine interacts exclusively with the human caller, the second machine learning model may learn from predictive responses generated by the AI engine when operating exclusively with the human caller. Responses generated by the AI engine when interacting exclusively with the human caller may be generated by the first machine learning model.

Based on the accepted or rejected responses, the AI engine may learn which machine generated responses where accepted by the caller or human agent. The AI engine may learn from the accepted or rejected responses how to generate future responses that are more likely to be accepted by the caller or human agent. For example, the AI engine may determine that for a given caller or human agent, suggested sentence completions will usually be rejected. During a subsequent interaction with the caller or human agent, the AI engine may take a more passive role and wait to generate responses until goals or intent of caller or human agent are clear or more definitive.

An interactive voice response ("IVR") system is provided. The system may include a telephony server. The telephony server may be a computer server. The server may be a network connected computer system. Computer servers, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the server may be embodied in hardware or firmware components of the server.

The server may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), and voice input and speech recognition applications. Software application programs may utilize one or more algorithms that formulate predictive machine responses, formulate database queries, process human caller inputs, process human agent inputs, or any other suitable tasks.

A server may include a communication circuit. The communication circuit may include a network interface card or adapter. When used in a WAN networking environment, apparatus may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

A server may utilize computer-executable instructions, such as program modules, executed by a processor. Generally, program modules include routines, programs, objects, components, data structures, etc. that perform particular tasks or implement abstract data types. A server may be operational with distributed computing environments where tasks are performed by remote processing devices that are linked through a communications network. In a distributed computing environment, program modules may be located in both local and remote computer storage media including memory storage devices. A server may rely on a network of remote servers hosted on the Internet to store, manage, and process data (e.g., "cloud computing" and/or "fog computing").

Servers disclosed herein may be produced by different manufacturers. For example, the caller may connect to the IVR system via a first server, and the AI engine may be run on a second server. A human agent may utilize a third server. Servers may capture data in different formats. Servers may use different data structures to store captured data. Servers may utilize different communication protocols to transmit captured data or communicate with other systems. Despite such operational differences, servers may be configured to operate substantially seamlessly to interact with the caller, human agent and the AI engine across different systems operating systems, hardware or networks.

The IVR system may include a telephony server. The telephony server, in operation, may receive inputs submitted by a caller using a communication network. The inputs submitted by the caller may include voice inputs. The inputs submitted by the caller may include text or touch inputs. The telephony server may provide an interface for the caller to interact with an AI engine over the communication network. The telephony server may transmit to the caller, over the communication network, responses to the inputs. The responses may be generated by the AI engine.

The IVR system may include an application server. The application server may host the AI engine. The application server may provide computer resources (hardware and software) for the implementing the AI engine. The application server may provide access to network connections for the AI engine to interact with callers and human agents.

The application server, in operation, may receive a first set of inputs generated by the caller. The application server may receive the first set of inputs from the telephony server. The first set of inputs may be voice inputs submitted by the caller.

The AI engine running on the application server may generate a machine interpretation of the first set of inputs received from the caller. The machine interpretation may identify the caller. The machine interpretation may identify a purpose, question or concern of the caller. Based on the machine interpretation, the AI engine may classify the first set of inputs as requiring intervention by a human agent.

Based on the classification, the AI engine may link a computer terminal accessible by the human agent to the application server. The computer terminal may be a computer server. After linking the terminal to the application server, the AI engine may receive, from the telephony server, a second set of inputs generated by the caller. The second set of inputs may include inputs submitted by the caller to the human agent. The AI engine may generate a machine interpretation of the second set of inputs.

The AI engine may monitor responses provided by a human agent to the caller. The AI engine may intercept the human agent's responses to the second set of inputs provided by the caller. The intercepting may include the AI engine displaying a machine generated response on the linked terminal of the human agent. The machine generated response may be formulated based a machine interpretation of the second set of inputs submitted by the caller.

The intercepting by the AI engine may reduce a duration of time the terminal is linked to the application server. When the AI engine provides machine generated responses to the human agent's linked terminal, the human agent may utilize those machine generated responses to efficiently resolve a concern of the caller. The intercepting by the AI engine may therefore shorten a duration of time the terminal is linked to the application server relative to time the terminal would have been linked to the application server without the intercepting by the AI engine.

The IVR system may include at least one database. The database may store transaction information associated with the caller. The database may be run on one or more computer servers. The database may run an application program interface ("API") that is compatible with the AI engine. The API may provide the AI engine access to the information stored on the database. The information stored on the database may include real-time and/or historical transaction data.

Machine interpretations of caller inputs may be generated by the AI engine based on the transaction information extracted from the database. The AI engine may extract and analyze transaction information before providing a machine generated response to the caller or human agent.

The AI engine may detect a rejection or acceptance by the human agent of the machine interpretation of the second set of caller inputs. The rejection or acceptance may be provided to the AI engine. Based on the rejection or acceptance, the AI engine may be recursively trained. Recursive training may reduce how often the AI engine links the terminal to the application server relative to how often the AI engine links the terminal to the application server without the recursive training. Fewer instances of linking the terminal to the application server may correspond to the AI engine successfully resolving concerns of a caller without requiring human agent intervention.

The AI engine may intercept responses to the second set of voice inputs provided by the human agent by providing predictive text to the terminal. The predictive text may be generated by the AI engine. The predicative text may complete keyboard inputs entered by the human agent in response to the caller's second set of inputs. By completing the keyboard inputs, the AI engine may allow the human agent to efficiently respond to the caller.

The AI engine may generate a machine interpretation of the second set of inputs based on the machine interpretation of the first set of voice inputs. The AI engine may account for its own prior machine generated responses when interacting exclusively with the caller when generating a machine generated response that will intercept a response of the human agent when the caller is interacting with a human agent.

Similarly, the AI engine may generate a machine interpretation of a second set of inputs (submitted by the caller to a human agent) based on responses to those inputs provided by the human agent. The AI engine may also generate a machine interpretation of the second set of inputs based on responses to a first set of inputs provided by the human agent (e.g., after the caller has been transferred to the human agent). When generating response that will intercept a current response of the human agent, the AI engine may account for the human agent's prior responses transmitted to callers.

The AI engine may detect whether the human agent agrees with the classification, by the AI engine, that a decision, by the AI engine to transfer the caller to a human agent was warranted. For example, after receiving a caller transferred by the AI engine, the human agent may transfer the caller back to the AI engine. The human agent may provide the AI engine with information directing the AI engine to perform a specific task to resolve a concern of the caller. For example, the human agent may direct the AI engine to interact exclusively with the caller and close an account or open a new account.

When a caller is transferred back to the AI engine, the AI engine may analyze the first set of inputs originally received from the caller and determine whether the instructions now provided by the human agent could have been gleaned from the first set of inputs it interpreted. The human agent may provide an indication of whether the caller should have been transferred to the human agent. The human agent may indicate to the AI engine that the caller's concern was in fact more efficiently resolved by transferring the caller to the human agent. The AI engine may be trained based on these indications provided by the human agent.

Such indicators provided by the human agent may not be explicit. For example, the AI engine may interpret that the human agent disagrees with the transfer based on actions taken by the human agent. For example, a transfer of the caller back to the AI engine without the human agent providing any response to the caller may indicate the human agent disagrees with the AI engine's decision to transfer.

An interactive voice response ("IVR") system is provided. The system may include a telephony server. The telephony server, in operation, receives inputs submitted by a caller using a communication network. The inputs submitted by the caller may include voice inputs, text, touch or any suitable inputs.

The telephony server may provide an interface for the caller to interact with an AI engine over the communication network. The telephony server may transmit to the caller, over the communication network, responses to the caller inputs generated by the AI engine.

The IVR system may include an application server. The application server may host the AI engine. The application server, in operation, receives, from the telephony server, a first set of inputs generated by the caller. The application server generates a machine interpretation of the first set of inputs. Based on the machine interpretation, the application server classifies the first set of inputs as raising a concern that requires intervention by a human agent.

Based on the classification, the application server links a terminal accessible by the human agent to the application server. The linking of the terminal and the application server establishes a communication path linking the human agent and the AI engine. After linking the terminal to the application server, the application server receives, from the telephony server, a second set of inputs generated by the caller. The second set of inputs are generated by the caller when interacting with the human agent.

The application server may generate a first set of machine responses to the second set of inputs. The first set of machine responses may be formulated for the caller. The application server also generates a second set of machine response to the second set of inputs. The second set of machine responses may be formulated for the human agent. In parallel, the application server provides the first set of machine responses to the caller and provides the second set of machine responses to the human agent.

By formulating machine responses based on input from both the caller and human agent and providing the machine responses generated based on those inputs in parallel to the human agent and caller, the application server increases the accuracy and relevance of the its machine generated responses. More accurate and relevant machine generated responses allow the caller to efficiently achieve their purpose or goal without assistance from the human agent. More accurate and relevant machine generated responses allow the human agent to efficiently address a caller's concerns. More accurate and relevant machine generated responses allow the human agent to efficiently address multiple callers concurrently. Thus, the providing of the first and second sets of machine responses in parallel reduces a duration of an interaction between the caller and the human agent relative a duration of interactions without the application server providing the responses in parallel.

The application server may apply a first machine learning model when the AI engine interacts exclusively with the human caller. The application server may apply a second machine learning model when the AI engine interacts with the human caller and the human agent.

Two or more callers may be concurrently linked to the terminal of a human agent. For example, the human agent may service two or more callers. The application server may apply a third machine learning model when the AI engine provides machine generated responses based on inputs received from two or more callers concurrently linked to a terminal.

When the human agent is servicing two or more callers, the AI engine may adapt its machine generated responses based on a workload of the human agent. For example, when the human agent is servicing a single caller, the AI engine may generate detailed responses. The detailed responses may be edited or otherwise customized by the human agent before transmission to the caller (e.g., via the telephony server). However, when the human agent is concurrently servicing two or more callers, the human agent may not have time to edit or customize machine responses generated by the AI engine. In such scenarios, the AI engine may formulate general or background information that may be useful to the human agent.

For example, based on a detected context of a conversation, the AI engine may load recent transactions associated with the caller. The AI engine may generate and provide a caller profile to the human agent. A profile may include an assessment of prior interactions with the caller. The profile may be specific to interactions conducted with a specific human agent. A profile may include a current financial snapshot of the caller. The profile may include final responses that have successfully resolved prior interactions with a caller. The profile may include suggested responses formulated by the AI engine to resolve a caller's current concerns.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system 100. System 100 includes computer server 101. Computer server 101 may be a telephony server. Computer server 101 may receive inputs submitted by a caller using mobile phone 117 and cellular communication network 119. Computer server 101 may receive inputs submitted by a caller using landline phone 113 and public switched telephone network ("PSTN") 115. Computer server 101 may receive inputs submitted by a caller using internet phone 109 using internet 111.

Computer server 101 may be configured to receive inputs concurrently from multiple callers using different devices and communication networks. Computer server 101 may provide an interface for callers to access AI engine 103 using any of communication networks 111, 115 or 119. In response to the received inputs, computer server 101 may transmit to a caller (e.g., using devices 109, 113 or 117) responses generated by AI engine 103. AI engine 103 may be hosted on an application server.

Based on inputs received from devices 109, 113 or 117 via computer server 101, AI engine 103 generates a machine interpretation of the inputs. AI engine 103 may determine, based on the inputs, whether one or more of callers using devices 109, 113 or 117 require intervention by human agent 105. AI engine may link devices 109, 113 or 117 to human agent 105.

After linking one or of devices 109, 113 or 117 to human agent 105, AI engine 103 receives, from computer server 101 additional inputs generated by callers using devices 109, 113 or 117. AI engine 103 generates a first set of machine responses based on the additional inputs. AI engine 103 may provide the first set of machine responses to callers using devices 109, 113 or 117 via computer server 101.

The first set of machine responses may be specially generated by AI engine 103 for callers using devices 109, 113 or 117. For example, AI engine 103 may customize the first set of machine generated responses for viewing or listening on a specific device 109, 113 or 117. The customization may include formatting the response for viewing on specific size screen or enabling interactive features based on device capability.

AI engine 103 may access transaction data stored on database 107. Based on transaction data stored on database 107, AI engine 103 may customize the first set of machine generated responses. For example, transaction data stored in database 107 may allow AI engine 103 to determine a reason why devices 109, 113 or 117 may have initiated contact with telephony server 101. For example, AI engine 103 may detect a recent or an anomalous transaction within database 107 that is linked to a caller using devices 109, 113 or 117. AI engine 103 may determine that the recent or an anomalous transaction is a likely cause for contacting telephony server 101.

AI engine 103 may use transaction data stored in database 107 to provide machine generated responses that include relevant and customized data to devices 109, 113 or 117. For example, AI engine 103 may generate text or provide instructions to a caller explaining how, using one of devices 109, 113 or 117, the caller may cure the recent or an anomalous transaction.

AI engine 103 may also generate a second set machine response to the additional inputs received after a caller has been transferred to human agent 105. The second set of machine generated responses may be provided to human agent 105. AI engine 103 may use transaction data stored on database 107 to generate machine responses that include relevant and customized data extracted from database 107. For example, AI engine 103 may provide human agent 105 a transcript of a prior interaction with the caller or flag transactions determined to be relevant to a caller's current concerns, as determined based on the additional inputs. Relevant transcripts and transactions may be located based on an identify of caller or prior communication/interaction of components 101, 103, 105 or 106 with devices 109, 113 or 117.

AI engine 103 may provide, in parallel, the first set of machine responses to one or more of devices 109, 113 or 117 and the second set of machine responses to the human agent 105. Providing the first and second sets of machine responses in parallel reduces a duration of a caller interaction relative a duration of interactions when AI engine 103 does not provide the first and second set of responses in parallel.

Figure 2:
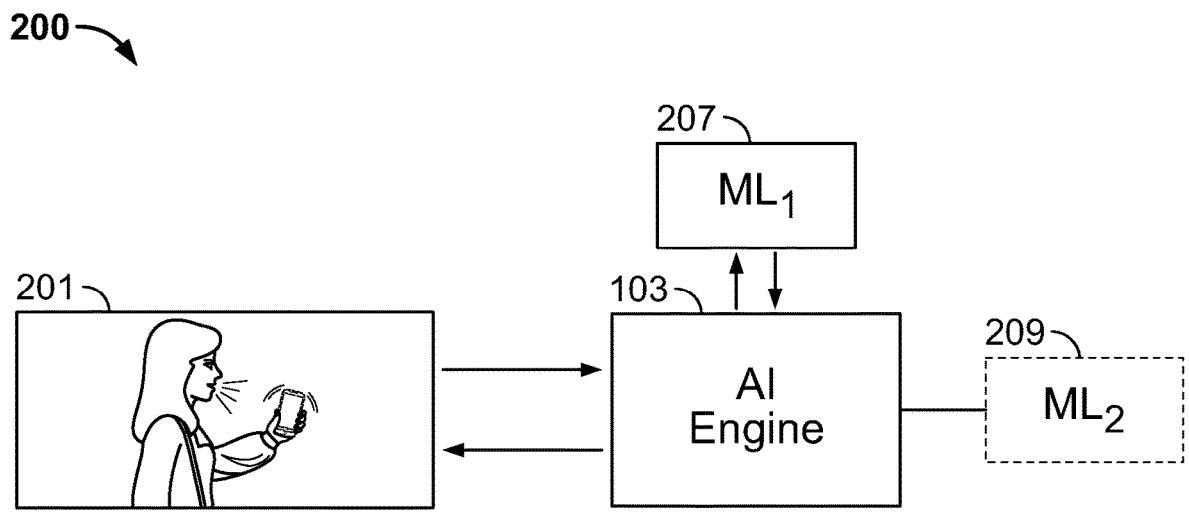
FIG. 2 shows an illustrative scenario and apparatus in accordance with principles of the disclosure.

FIG. 2 shows illustrative scenario 200. Scenario 200 shows caller 201 using a device (such as one of devices 109, 113 or 117 shown in FIG. 1) to access AI engine 103. AI engine 103 includes first machine learning model ("$ML_1$") 207 and second machine learning model ("$ML_2$") 209. Scenario 200 shows that when AI engine 103 communicates exclusively with caller 201, AI engine 103 applies $ML_1$ 207.

Scenario 200 shows $ML_1$ 207 in solid line, indicating that it is the active machine learning model being applied by AI engine 103. ML$_2$ 209 is shown in broken line, indicating that it is currently not being applied by AI engine 103.

ML$_1$ 207 may be specially designed to interact with caller 201. ML$_1$ 207 may be specially designed to respond to inquiries received from caller 201. For example, ML$_1$ 207 may be trained based on prior interactions with caller 201. ML$_1$ 207 may be specially designed to provide responses to a device being used by caller 201.

Figure 3:
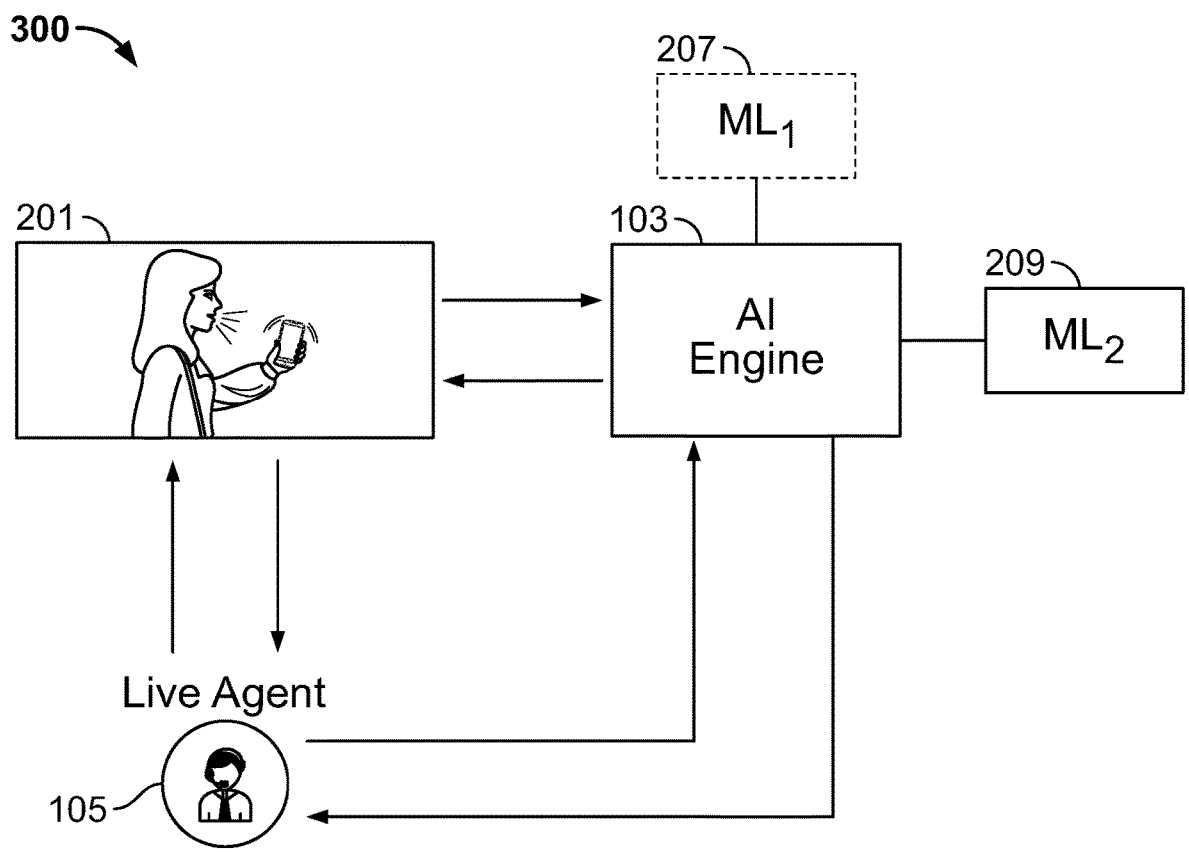
FIG. 3 shows an illustrative scenario and apparatus in accordance with principles of the disclosure.

FIG. 3 shows illustrative scenario 300. Scenario 300 shows caller 201 using a device (such as one of devices 109, 113 or 117 shown in FIG. 1) to access AI engine 103. Scenario 300 also shows that AI engine is also in communication with human agent 105. For example, AI engine 103 may initially interact with caller 201 without assistance from human agent 105. As shown in FIG. 2, AI engine 103 may utilize ML$_1$ 207 when interacting with exclusively with caller 201.

AI engine 103 may generate a predictive recommendation to transfer the human caller to a human agent 105. For example, AI engine 103 may be unable to determine a goal or concern of caller 201. AI engine 103 may initiate a hand-off procedure and transfer caller 201 to human agent 105.

Scenario 300 shows that after transferring caller 201 to human agent 105, AI engine 103 may continue to monitor inputs provided by caller 201. AI engine 103 may also monitor responses provided to caller 201 by human agent 105. Scenario 300 shows that when AI engine 103 communicates with caller 201 and human agent 105, AI engine 103 applies ML$_2$ 209. AI engine 103 may utilize ML$_2$ 209 when monitoring interactions of caller 201 and human agent 105. After caller 201 is transferred to human agent 105, AI engine 103 may utilize ML$_2$ 209 when generating machine responses for caller 201 and/or human agent 105.

AI engine 201 may only apply ML$_2$ 209 after transferring caller 201 to human agent 105. In some embodiments, after transferring caller 201 to human agent 105 AI engine 103 may apply both ML$_1$ 207 and ML$_2$ 209. For example, AI engine 103 may apply ML$_1$ 207 when interacting with caller 201 and ML$_2$ 209 when interacting with human agent 105.

Scenario 300 shows ML$_2$ 209 in solid line, indicating that it is the currently the active machine learning model being applied by AI engine 103. ML$_1$ 207 is shown in broken line, indicating that it is currently not being applied by AI engine 103.

ML$_2$ 209 may be specially designed to interact with caller 201 and human agent 105 in parallel. ML$_2$ 209 may be specially designed to respond to inquiries received from caller 201 and formulate proposed responses for human agent 105. For example, ML$_2$ 209 may be trained based on prior interactions with human agent 105. ML$_2$ 209 may be specially designed to provide responses on a device being used by human agent 105.

Using ML$_2$ 209, AI engine 103 may provide human agent 105 predictive responses to the inputs received from caller 201. By providing human agent 105 predictive responses, AI engine 103 may shortening a duration of an interaction between human agent 105 and caller 201. By providing human agent 105 predictive responses, AI engine 103 may allow human agent 105 to effectively manage a plurality of concurrent interactions with multiple callers.

Figure 4:
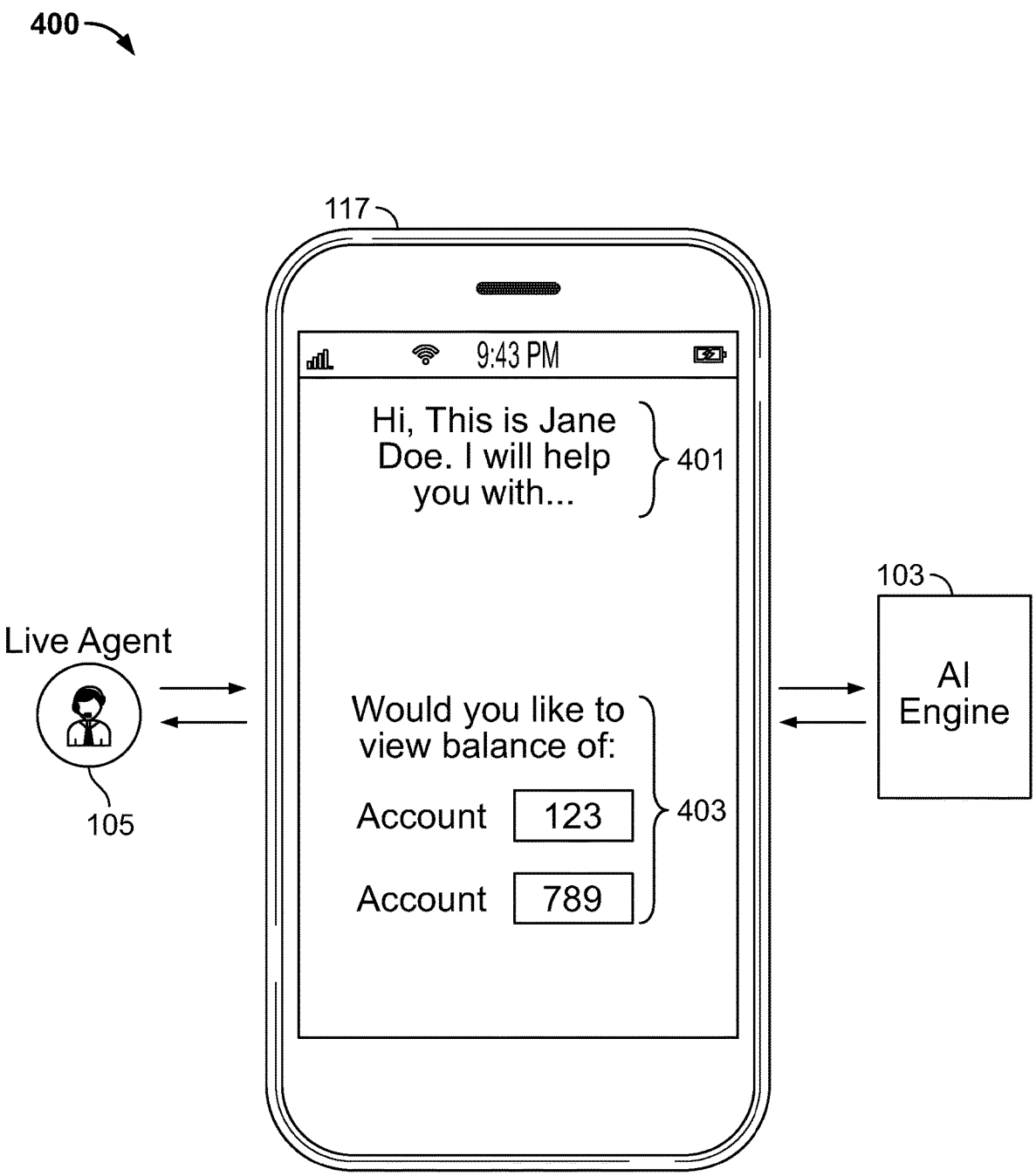
FIG. 4 shows illustrative apparatus in accordance with principles of the disclosure.

FIG. 4 shows illustrative scenario 400. Scenario 400 shows caller 201 (shown in FIG. 2) using device 117 (shown in FIG. 1) being provided responses generated both by human agent 105 and AI engine 103 in parallel. Scenario 400 shows that human agent 105 has provided response 401. Response 401 informs caller 201 that human agent 105 is available to ready assist.

Scenario 400 also shows that AI engine 103 has provided machine generated response 403. Machine generated response 403 informs caller 201 that AI engine 103 may have located information desired by caller 201. Machine generated response 403 also informs caller 201 how to access the desired information using device 117. AI engine 103 may generate response 403 using ML$_1$ 207 or ML$_2$ 209 (shown in FIG. 2).

If machine generated response 401 does not provide the information desired by caller 201, caller 201 may interact with human agent 105. If machine generated response 401 does provide the desired information, caller 201 may not need to interact with human agent 105. By providing caller 201 predictive responses, AI engine 103 may shorten a duration, or bypass entirely, interaction between human agent 105 and caller 201.

Figure 5:
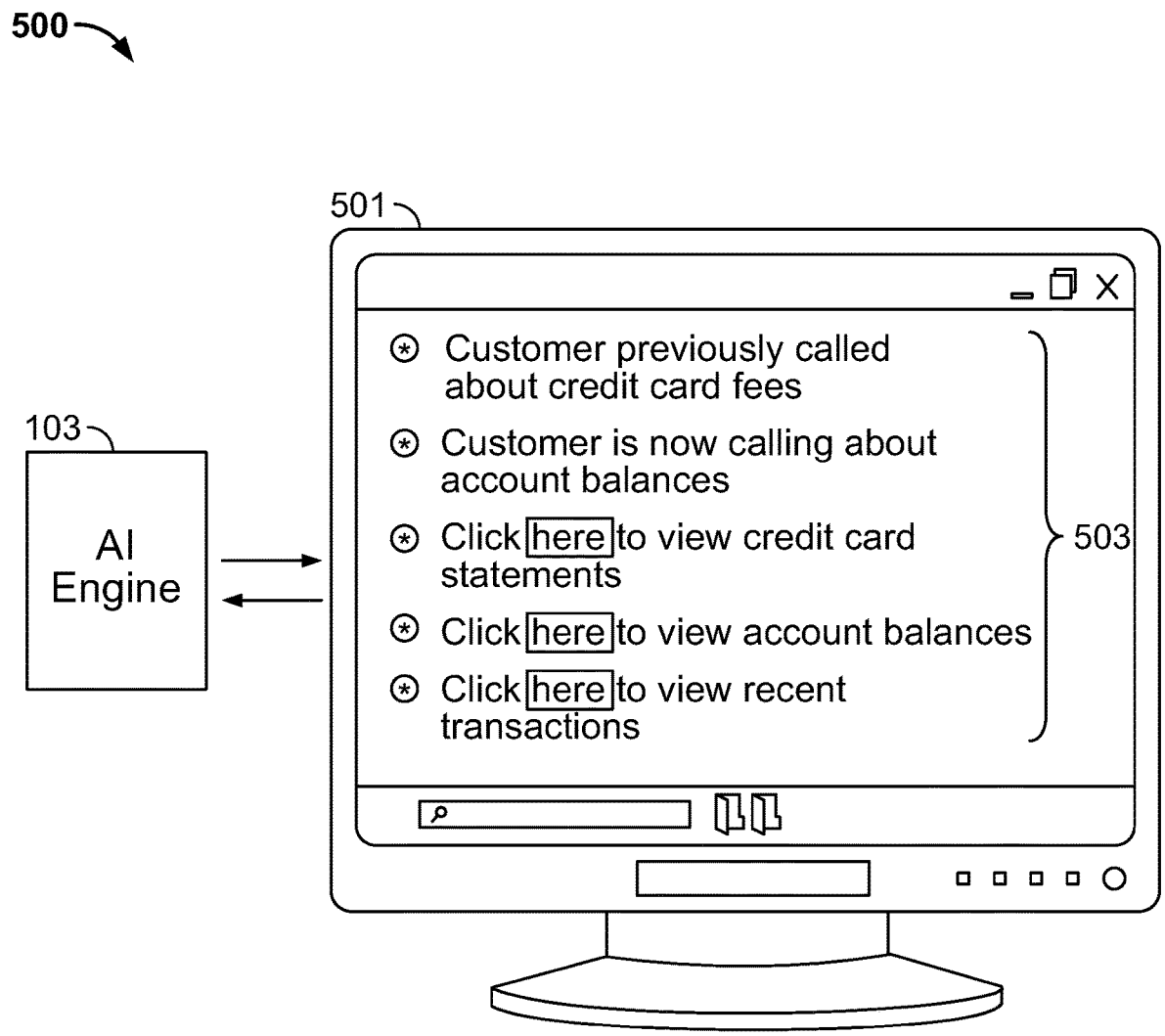
FIG. 5 shows illustrative apparatus in accordance with principles of the disclosure.

FIG. 5 shows illustrative scenario 500. Scenario 500 shows AI engine 103 providing machine generated responses 503 to human agent 105 via terminal 501. AI engine 103 may generate responses 503 using ML$_2$ 209 (shown in FIG. 2). Responses 503 may provide templated response options for human agent 105 to quickly respond to caller 201. Human agent 105 may select one or more of responses 503 and transmit them to caller 201 (e.g., to device 117).

If machine generated responses 503 do not provide information or a response desired by human agent 105, human agent 105 may reject responses 105. Human agent 105 may select an edit one or more of responses 503. If machine generated responses 503 do provide the desired information, human agent 105 may not need to formulate an original response for user 201.

By providing human agent 105 predictive responses 503, AI engine 103 may shorten a duration or bypass entirely interaction between human agent 105 and caller 201. By providing human agent 105 predictive responses 503, AI engine 103 may allow human agent 105 to effectively manage a plurality of concurrent conversations with multiple callers. Human agent 105 may quickly select one or more of predictive responses 503 for transmission to a caller. By utilizing predicative responses 503 it takes human agent 105 less time to respond to each caller, allowing human agent 105 to efficiently manage a plurality of concurrent conversations with multiple callers.

Figure 6:
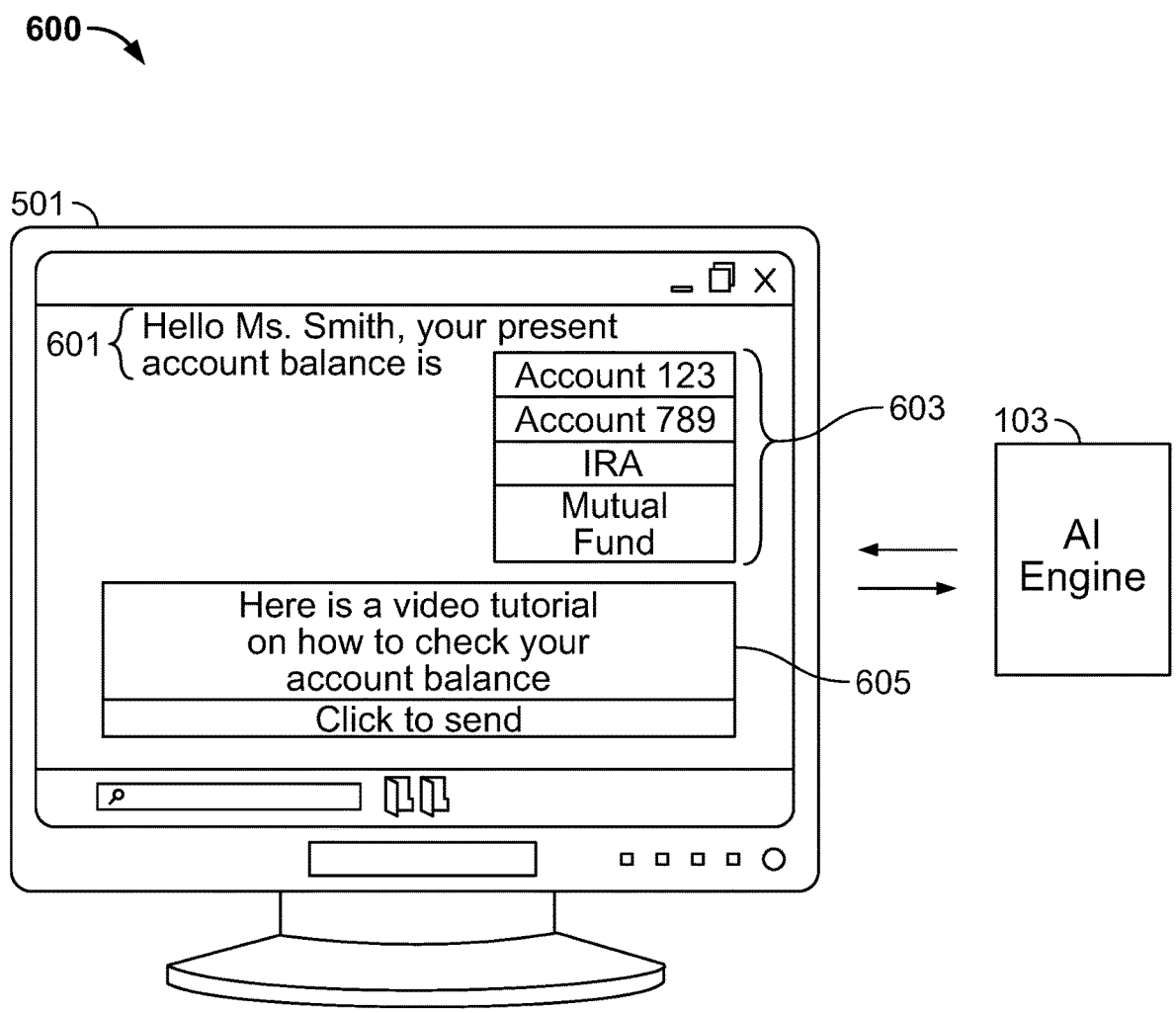
FIG. 6 shows illustrative apparatus in accordance with principles of the disclosure.

FIG. 6 shows illustrative scenario 600. Scenario 600 shows AI engine 103 providing machine generated responses 603 and 605 to human agent 105 via terminal 501. AI engine 103 may generate responses 603 and 605 using ML$_2$ 209 (shown in FIG. 2).

Scenario 600 shows that human agent 105 has entered keyboard input 601 in response to interaction with caller 201. AI engine 103 may monitor keyboard inputs of human agent 105. AI engine 103 generates predictive text 603 that offers options for completing a message embodied in keyboard input 601. Human agent 103 may select one or more of the response options of predictive text 603 and efficiently respond to caller 201.

Scenario 600 also shows that AI engine 103 has generated alternative response 605. Alternative response 605 may provide additional information that may be helpful to caller 201. For example, AI engine 103 may determine (e.g., using ML$_1$ 207) that based on a response received from caller 201 in scenario 400, caller 201 is interested in checking the balance of their account. AI engine 103 may also determine that caller 201 has contacted telephony server 101 (shown in FIG. 1) multiple times with an account balance inquiry. AI engine 103 may suggest that human agent 105 provide caller 201 with response 605 to enable caller 201 to view account balances without waiting for a response from system 100.

Human agent 105 may transmit response 605 to caller 201. Human agent 201 may advise caller 201 that response 605 will be provided. Response 605 may provide caller 201 a tutorial video that is specially formatted for optimal viewing on device 117. Response 605 may provide caller 201 a tutorial video that is specially designed to explain how to access accounts held by user 201. For example, response 605 may provide caller 201 a tutorial video that is specially formatted based on live accounts of caller 201. AI engine 103 may customize the tutorial video using data extracted from database 107 (shown in FIG. 1).

Figure 7:
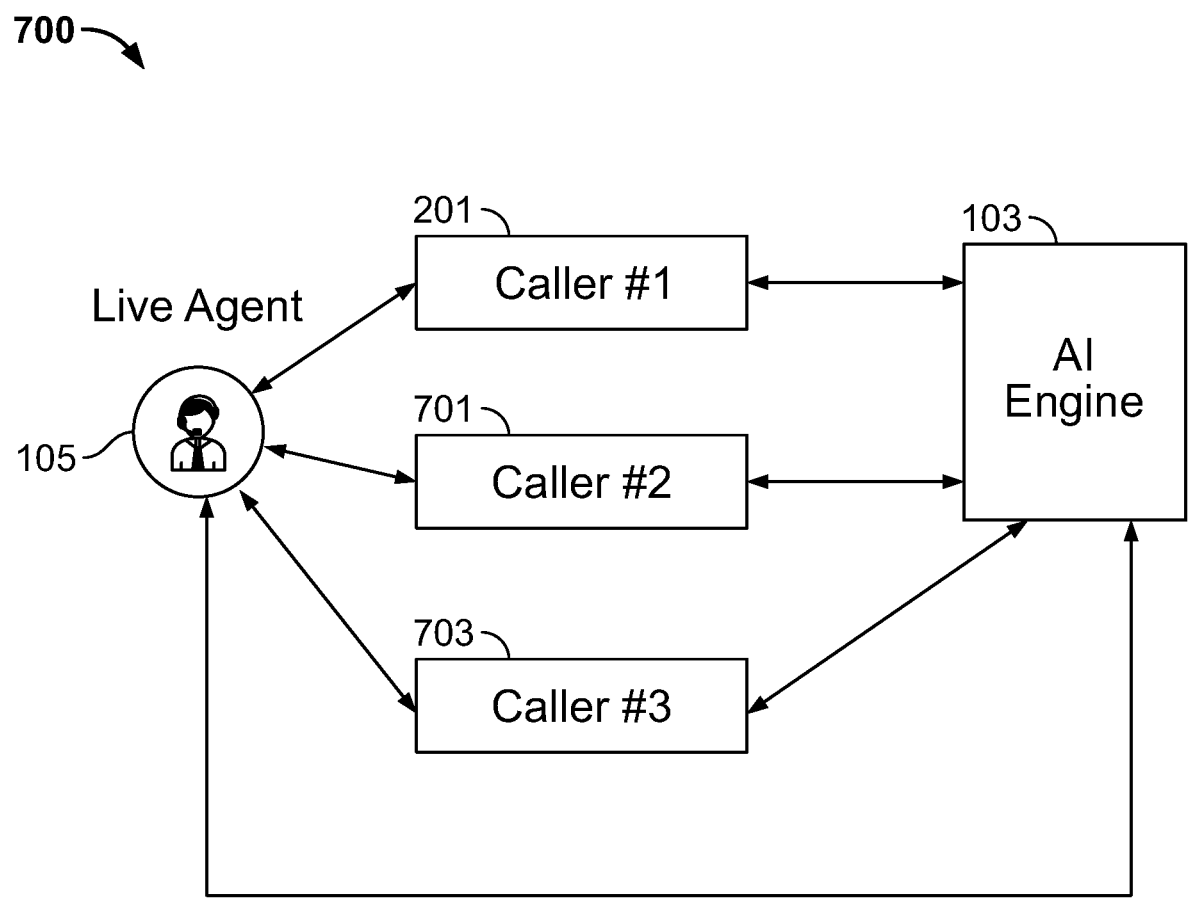
FIG. 7 shows an illustrative system in accordance with principles of the disclosure.

FIG. 7 shows illustrative scenario 700. Scenario 700 shows that with the assistance of AI engine 103, human agent 105 is managing concurrent conversations with callers 201, 701 and 703. AI engine 103 may independently generate predictive responses for each of the conversations managed by human agent 105. Each predictive response generated by AI engine 103 may be customized for one of the callers 201, 701 and 703.

Human agent 105 may select a machine generated responses and forward it to one or more of callers 201, 701 and 703. By providing human agent 105 with machine generated responses, AI engine 103 allows human agent 105 to manage multiple concurrent conversations. The machine generated responses provided by AI engine 103 reduce the amount of time human agent 105 would otherwise need to spend formulating an original response for each of callers 201, 701 and 703.

Figure 8:
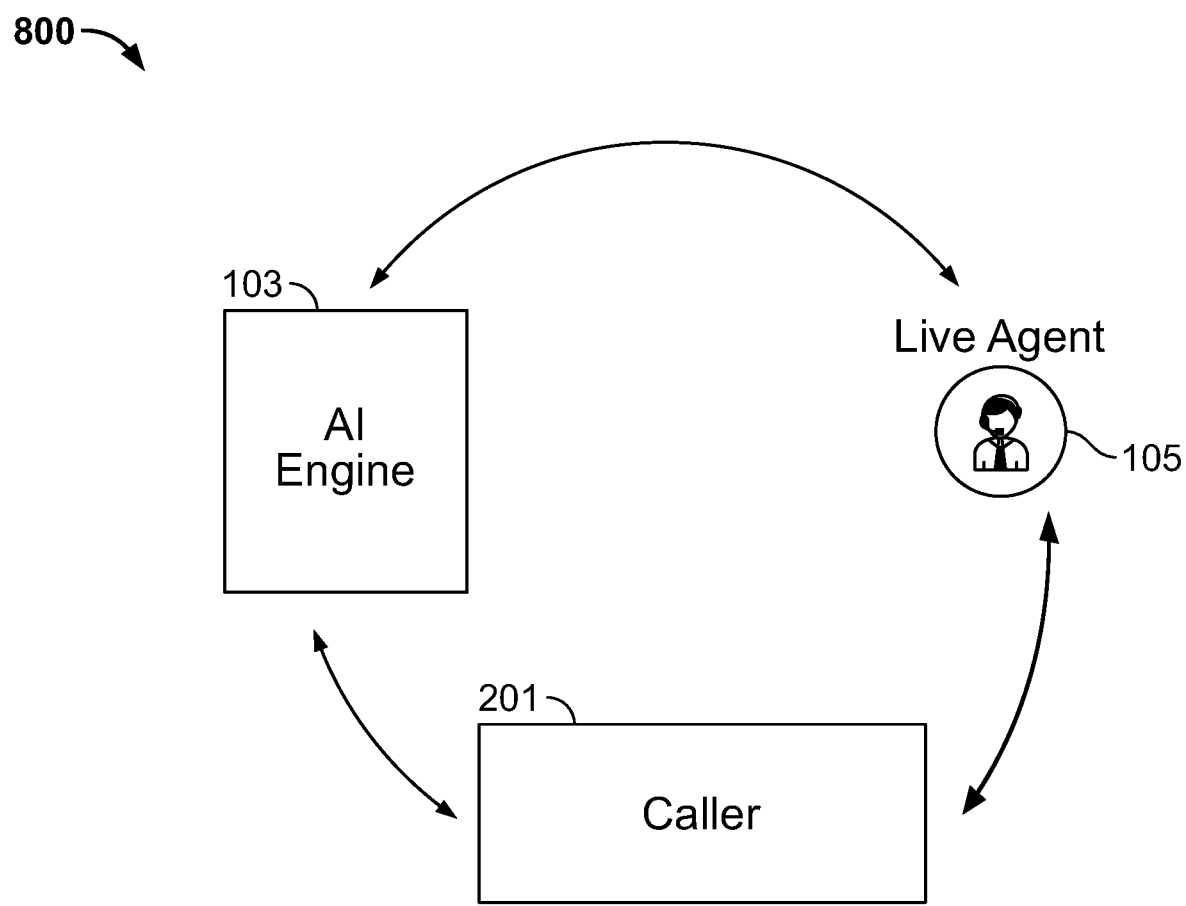
FIG. 8 shows an illustrative process in accordance with principles of the disclosure.

FIG. 8 shows illustrative process 800. Process 800 shows an illustrative cycle for training AI engine 103. Process 800 shows that AI engine 103 monitors responses of human agent 105 provided to caller 201. AI engine 103 may be recursively trained by monitoring which responses of human agent 105 are utilized, rejected or ignored by caller 201. AI engine 103 may be recursively trained by monitoring which machine responses generated for human agent 105 are utilized, ignored or rejected by human agent 105 and/or caller 201.

Process 800 shows that AI engine 103 provides machine generated responses directly to caller 201. AI engine 103 may be recursively trained by monitoring which machine generated responses transmitted directly to caller 201 are utilized, ignored or rejected by caller 201.

AI engine 103 may also monitor which machine generated responses are accepted or rejected by the human agent 105 when the AI engine 103 interacts with caller 201 and human agent 105 in parallel. AI engine 103 may also be trained by monitoring responses formulated by human agent 105 and determining which of those responses are utilized, ignored or rejected by caller 201. By monitoring responses formulated by human agent 105, AI engine 103 may determine whether human agent 103 agrees that caller 201 needed the assistance of human agent 105.

Recursive training of AI engine 103 may reduce how often AI engine 103 transfers caller 201 to human agent 105. Recursive training of AI engine 103 may improve a relevance of responses generated by AI engine 103. Recursive training of AI engine 103 may improve accuracy and relevance of machine responses generated by AI engine 103 when interacting with human agent 103 and caller 201 in parallel.

Figure 9:
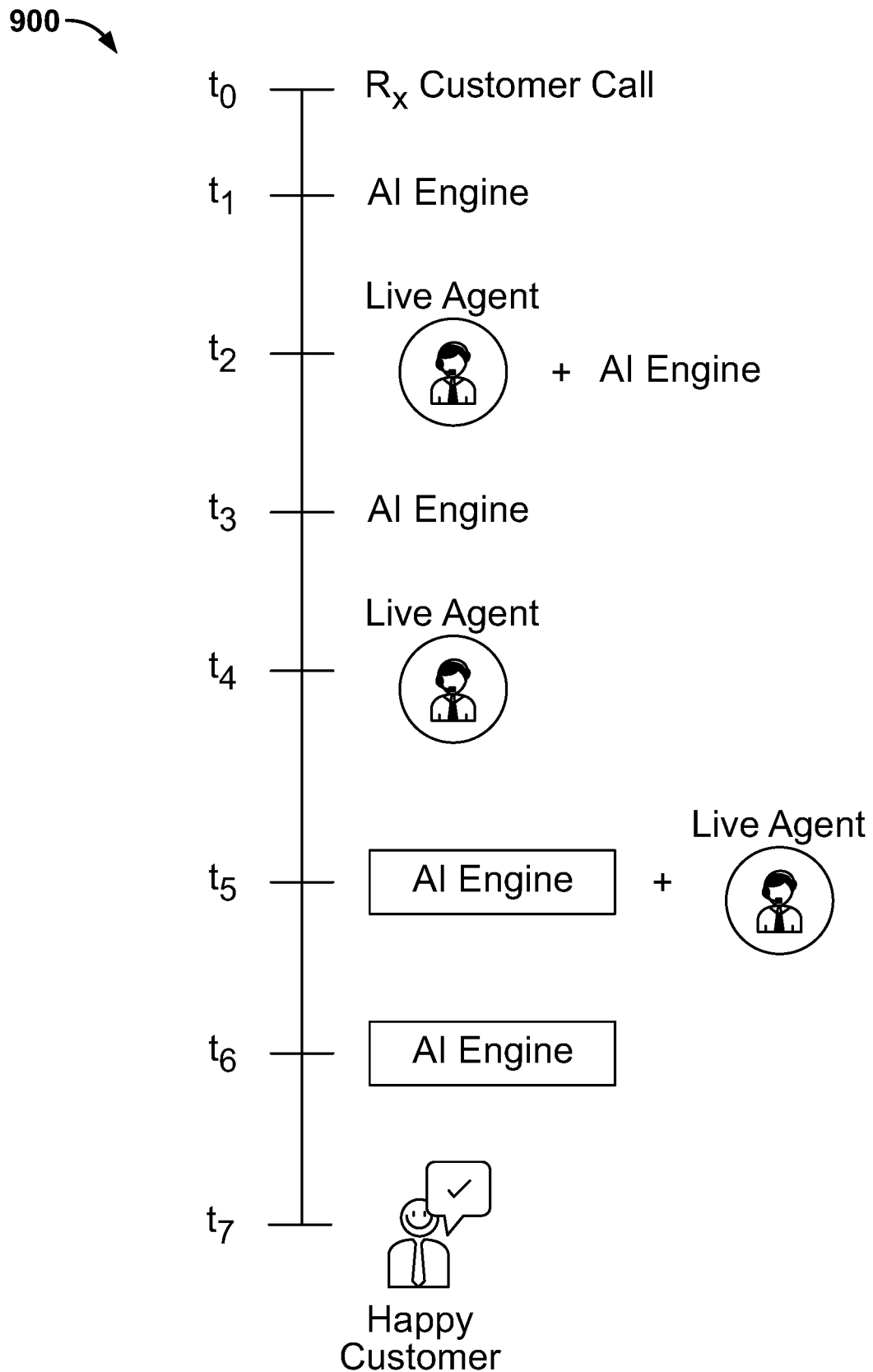
FIG. 9 shows an illustrative process in accordance with principles of the disclosure.

FIG. 9 shows illustrative scenario 900. Scenario 900 shows that at $t_0$, a caller initiates contact with an IVR system, such as system 100 (shown in FIG. 1). At $t_1$, an AI engine initiates intake of the caller and attempts to understand the caller's purpose or goal for initiating contact with the IVR system.

At $t_2$, the AI engine links the caller to a human agent. The AI engine may link the caller to the human agent because the AI engine cannot determine the caller's purpose or goal for initiating contact with the IVR system. The AI engine may link the caller to the human agent based on a determination that the caller's purpose or goal of the caller may best be served by contact with a human agent.

Scenario 900 shows that even after transferring the caller to the human agent, at $t_2$, the AI engine continues to monitor inputs provided by the caller. At $t_2$, the AI engine may also monitor responses provided to the caller by the human agent.

At $t_3$, the human agent has transferred the caller back to the AI engine. For example, while monitoring interaction between the human agent and the caller the AI engine may have suggested a response that indicates, to the human agent, that the AI engine now understands the purpose or goal of the caller.

At $t_4$, the caller has been transferred back to the human agent. After the AI engine responds to the caller, the human agent may contact the caller again to confirm that the caller's purpose or goal for initiating contact with the IVR system has been achieved.

At $t_5$, the AI engine may suggest responses for the human agent to provide to the caller. For example, the AI engine may suggest tutorial videos. At $t_6$, the human agent may select one of the responses suggested by the AI engine and hand-off control of the interaction to the AI engine. At $t_7$, operation of the AI engine in parallel with the human agent has successfully achieved the purpose or goal of the caller.

Thus, methods and apparatus for ARTIFICIAL INTELLIGENCE ("AI") INTEGRATION WITH LIVE CHAT are provided. Persons skilled in the art will appreciate that the present invention can be practiced by other than the described embodiments, which are presented for purposes of illustration rather than of limitation, and that the present invention is limited only by the claims that follow.

What is claimed is:

1. An interactive voice response ("IVR") system comprising:
    a telephony server that, in operation:
        receives voice inputs submitted by a caller using a communication network;
        provides an interface for the caller to interact with an artificial intelligence ("AI") engine over the communication network; and
        transmits to the caller, over the communication network, responses to the voice inputs generated by the AI engine; and
    an application server hosting the AI engine that, in operation:
        receives, from the telephony server, a first set of voice inputs generated by the caller;
        applies a first machine learning model to the first set of voice inputs and generates a machine interpretation of the first set of voice inputs comprising identification of the caller and a current concern of the caller;
        based on the machine interpretation of the first set of voice inputs, classifies the caller as requiring intervention by a human agent;
        based on the classification, links a terminal accessible by the human agent to the application server; and after linking the terminal to the application server:
receives, from the telephony server, a second set of voice inputs generated by the caller;
applies a second machine learning model to the second set of voice inputs and generates a machine interpretation of the second set of voice inputs, based on:
a target historical conversation determined to be associated with the current concern of the caller; and
a resolution applied to the target historical conversation;
intercepts responses to the second set of voice inputs provided by the human agent via the terminal with the machine interpretation of the second set of voice inputs by displaying to the human agent on the terminal the machine interpretation of the second set of voice inputs; and
wherein:
the intercepting reduces a duration of time the terminal is linked to the application server relative to a duration of time the terminal is linked to the application server without the intercepting;
the first machine learning model is utilized by the application server when the AI engine interacts exclusively with the caller;
the second machine learning model is utilized by the application server when the AI engine interacts with the human caller in parallel with the human agent; and
the second machine learning model is trained using machine interpretations generated by the AI engine and accepted, edited or rejected by the human agent.

2. The IVR system of claim 1 further comprising at least one database:
storing real-time transaction information associated with the caller; and
running an application program interface that provides the AI engine access to the real transaction information;
wherein the machine interpretations of the first and second sets of voice inputs are based on the real-time transaction information.

3. The IVR system of claim 1:
wherein the AI engine detects rejection or acceptance by the human agent of the machine interpretation of the second set of voice inputs; and
AI engine is recursively trained using the rejection or acceptance and thereby reduces the number of times the AI engine links the terminal to the application server relative to the number of times the AI engine links the terminal to the application server without the recursive training.

4. The IVR system of claim 3 wherein the recursive training reduces the number of times the AI engine classifies the first set of voice inputs as requiring intervention by the human agent relative to the number of times the AI engine classifies the first set of voice inputs as requiring intervention by the human agent without the recursive training.

5. The IVR system of claim 3, wherein the AI engine detects whether the human agent agrees with the classification of the first set of voice inputs as requiring intervention by the human agent;
wherein the first machine learning model is trained based on whether the human agent agrees with the classification.

6. The IVR system of claim 1, wherein the AI engine intercepts the responses to the second set of voice inputs provided by the human agent by providing to the terminal predictive text, generated by the AI engine, that completes keyboard inputs entered by the human agent in response to the second set of voice inputs.

7. The IVR system of claim 1 wherein the AI engine generates the machine interpretation of the second set of voice inputs based on the machine interpretation of the first set of voice inputs.

8. The IVR system of claim 1 wherein the AI engine generates the machine interpretation of the second set of voice inputs based on the responses to the second set of voice inputs provided by the human agent via the terminal and the machine interpretation of the first set of voice inputs.

9. An interactive voice response ("IVR") system comprising:
a telephony server that, in operation:
receives voice inputs submitted by a caller using a communication network;
provides an interface for the caller to interact with an artificial intelligence ("AI") engine over the communication network and interact with the IVR system; and
transmits to the caller, over the communication network, responses to the voice inputs generated by the AI engine; and
an application server hosting the AI engine that, in operation:
receives, from the telephony server, a first set of voice inputs generated by the caller;
generates a machine interpretation of the first set of voice inputs;
based on the machine interpretation, classifies the first set of voice inputs as requiring intervention by a human agent;
based on the classification, links a terminal accessible by the human agent to the application server; and
after linking the terminal to the application server:
receives, from the telephony server, a second set of voice inputs generated by the caller;
generates a first set of machine responses to the second set of voice inputs using a first machine learning algorithm that is trained for interaction with the caller and the application server;
generates a second set of machine responses to the second set of voice inputs using a second machine learning algorithm that is trained for interaction with the human caller and the human agent; and
in parallel, provides the first set of machine responses to the caller and provides the second set of machine responses to the human agent;
wherein, providing the first and second sets of machine responses in parallel reduces a duration of the interaction between the caller and the IVR system relative an interaction duration without providing the responses in parallel.

10. The IVR system of claim 9, wherein the AI engine applies a third machine learning model when the AI engine provides the set of machine responses for two or more callers linked to the human agent.

11. A method for leveraging artificial intelligence to integrate human and machine responses within an interactive voice response ("IVR") system, the method comprising:
initiating an interaction with a human caller and an artificial intelligence ("AI") engine;

providing voice inputs from the human caller to the AI engine;

receiving, from the AI engine, a predictive recommendation to transfer the human caller to a human agent;

initiating a hand-off procedure and transferring the human caller to the human agent; and after transferring the human caller to the human agent:
continuing to provide the caller's voice inputs to the AI engine and providing responses to the caller's voice inputs generated by a first machine learning model that is trained for direct interaction between the AI engine and the caller;

providing, to the human agent, predictive responses to the caller's voice inputs generated by the AI engine using a second machine learning model that is trained for interaction with the human caller, the AI engine and the human agent; and recursively training the AI engine by providing to the AI engine:
responses of the human agent to the caller's voice inputs; and
responses of the caller to the predictive responses generated by the AI engine and provided to the human agent;

wherein:
the recursive training reduces a frequency of when the AI engine generates the predictive recommendation to transfer the human caller to the human agent; and
providing the machine generated responses to the caller and human agent in parallel:
shortens a duration of the interaction by responding to the caller's inputs in parallel with the human agent; and
increases a number of concurrent interactions managed by the human agent by responding to the caller's inputs providing responses to the caller's voice inputs generated by a first machine learning model after the interaction is transferred to the human agent.

12. The method of claim 11 further comprising, after the human caller has been transferred to the human agent, the AI engine providing, in parallel, a first number of predictive responses directly to the human agent and a second number of predictive responses directly to the human caller;
wherein, the first number is greater than the second number.

13. The method of claim 11 further comprising recursively training the AI engine by the AI engine ingesting:
predictive responses generated by the AI engine and accepted by the human agent; and
predictive responses generated by the AI engine and rejected by the human agent.

14. The method of claim 11 further comprising:
providing, to the AI engine, keyboard inputs generated by the human agent; and
providing to the human agent predictive text, generated by the AI engine, that completes a message of the human agent embodied in the keyboard inputs.

15. The method of claim 11, the transferring of the human caller to the human agent comprising:
providing the human agent with at least two or more historical interactions conducted by the AI engine with the human caller;
a predicative indicator of at least one target interaction most relevant to the interaction; and
based on the predictive indicator, loading into a computer system used by the human agent, a transaction history associated with the target interaction.

16. The method of claim 11, further comprising training the AI engine by providing:
to the second machine learning model, the predictive responses generated by the AI engine and accepted or rejected by the human caller when the AI engine interacts exclusively with the human caller; and
to the first machine learning model, the predictive responses generated by the AI engine and accepted or rejected by the human agent when the AI engine interacts with the human caller and the human agent in parallel.

* * * * *